United States Patent [19]

Taylor

[11] Patent Number: 4,584,199

[45] Date of Patent: Apr. 22, 1986

[54] ANTIBOTULINAL AGENTS FOR HIGH MOISTURE PROCESS CHEESE PRODUCTS

[75] Inventor: Stephen L. Taylor, Madison, Wis.

[73] Assignee: Aplin & Barrett, Ltd., Beaminster, England

[21] Appl. No.: 543,968

[22] Filed: Oct. 20, 1983

Related U.S. Application Data

[63] Continuation-in-part of Ser. No. 503,305, Jun. 10, 1983, abandoned.

[51] Int. Cl.$^4$ .......................... A23C 9/12; A23C 3/00; A23C 19/00
[52] U.S. Cl. ........................................ 426/36; 426/38; 426/330.2; 426/334; 426/582
[58] Field of Search ...................... 426/36, 38, 9, 334, 426/330.2, 582

[56] References Cited

U.S. PATENT DOCUMENTS

| | | | |
|---|---|---|---|
| 2,744,827 | 5/1956 | Mattick et al. | 426/9 |
| 3,579,354 | 5/1971 | Kasik et al. | 426/36 |
| 4,158,607 | 6/1979 | Kalinowski et al. | 426/36 |
| 4,205,132 | 5/1980 | Sandine et al. | 426/36 |
| 4,318,928 | 3/1982 | Sing | 426/36 |
| 4,477,471 | 10/1984 | Gonzalez | 426/36 |

FOREIGN PATENT DOCUMENTS

| | | | |
|---|---|---|---|
| 511616 | 4/1955 | Canada | 426/36 |
| 713251 | 3/1952 | United Kingdom | 426/36 |
| 739097 | 6/1980 | U.S.S.R. | 426/36 |

OTHER PUBLICATIONS

Scott et al.: "Effect of Nisin on the Outgrowth of Clostridium botulinum Spores", J. Food Sci., 46(1):117–120+126.

Scott et al.: "Temperature, pH, and Spore Load Effects on the Ability of Nisin to Prevent the Outgrowth of Clostridium botulinum Spores," J. Food Sci., 46(1):121–126.

Somers et al.: "Further Studies on the Antibotulinal Effectiveness of Nisin in Acidic Media", J. Food Sci., 46(6):1972–1973, 1981.

Tanaka et al.: "A Challenge of Pasteurized Process Cheese Spread with Clostridium botulinum Spores", J. Food Prot., vol. 42, No. 10, pp. 787–789 (Oct. 1979).

Kautter et al.: "Toxin Production by Clostridium botulinum in Shelf-Stable Pasteurized Process Cheese Spreads," J. Food Prot., vol. 42, No. 10, pp. 784–786 (Oct. 1979).

The National Collection of Industrial Backteria, Catalogue of Strains, 3rd Ed., Min. of Agric. Fisheries & Food, Torry Research Station, p. 201.

McKay et al.: "Conjugative 40 Megadalton Plasmid in Streptococcus lactis . . . ," Applied and Environmental Microbiology, Jan. 1984, pp. 68–74.

McClintock et al.: "Action Inhibitrice des Streptocoques . . . ", N.I.R.D. Paper No. 1298, Reprinted from J. of Dairy Research, vol. 19, No. 2, Jun. 1952, pp. 187–193.

Primary Examiner—Christine M. Nucker
Attorney, Agent, or Firm—Cushman, Darby & Cushman

[57] ABSTRACT

Process cheese spreads containing moisture in amounts ranging from 54% to 60% by weight are prepared by including from 2,000 to 10,000 I.U. of nisin and the outgrowth of Clostridium botulinum spores is prevented even when the product is stored for an extended period of time at 30° C.

13 Claims, No Drawings

ANTIBOTULINAL AGENTS FOR HIGH MOISTURE PROCESS CHEESE PRODUCTS

This is a continuation-in-part of application Ser. No. 503,305, filed June 10, 1983, now abandoned.

BACKGROUND OF THE INVENTION

Nisin, an antimicrobial substance produced by certain strains of *Streptococcus lactis*, has known food preservative use. It has the property of inhibiting the growth of certain Gram-positive bacteria, but not Gram-negative ones or yeasts or molds. A further, and most important practical property, lies in the ability of Nisin to prevent the outgrowth of germinated bacterial spores. The commercial use of Nisin to date very much relates to the property of preventing the outgrowth of germinated bacterial spores, in some applications that involves the prevention of spoilage in foods which have received at least sufficient heat treatment to destroy vegetative bacterial cells. Another classic use has been for the prevention of clostridial spoilage in process cheese products, which receive a less severe heat treatment.

The use of Nisin in process cheese products has been the subject of earlier patents; see British Pat. No. 713,251 and U.S. Pat. No. 2,744,827 dated 1954 and 1956, respectively. These patents relate to the manufacture or preservation of cheese of kinds liable to become blown or distended due to the growth of spoilage organisms which are anaerobic sporeformers, typically bacteria known as Clostridia. They also relate to process cheese which is liable to be spoiled as above. The levels of Nisin referred to in these patents are in the range of 50 to 375 units per gram. One "unit" is equivalent to 1 International Unit (I.U.) of Nisin activity and is equivalent to 0.025 microgram of Nisin.

Until recent times it was not considered that process cheese products would be liable to spoilage by *Clostridium botulinum* organisms or that the production of the associated toxin would present a potential health risk. Recent findings however are that such risks can exist, particularly in process cheese formulations where the water content is in excess of 54 percent. See Kautter et al "Toxin Production by *Clostridium botulinum* in Shelf-Stable Pasteurized Process Cheese Spreads", Journal of Food Protection, 42 pp. 784-786 (1979); Scott and Taylor, "Effect of Nisin on the Outgrowth of *Clostridium botulinum* Spores", J. Food Sci., 46(1) pp. 117-120 (1981); Scott and Taylor, "Temperature, pH, and Spore Load Effects on the Ability of Nisin to Prevent on the Outgrowth of *Clostridium botulinum* Spores", J. Food Sci. 46(1): 121-126 (1981); and Somers and Taylor, Research Note—"Further Studies on the Antibotulinal Effectiveness of Nisin in Acidic Media", J. Food Sci., 46(6): p. 1972-3.

Our studies at the fundamental level have shown that Nisin does have the ability to inhibit growth of botulinum spores from different culture and type sources. The significant finding, however, is that the levels of Nisin required to effect complete inhibition are substantially higher for *Clostridium botulinum* than for other non-pathogenic clostridia or aerobic sporeformers commonly encountered as food spoilage organisms. We have further demonstrated in a protracted shelf-life study with high-moisture, reduced sodium process cheese spread that complete inhibition of *Clostridium botulinum* spore outgrowth is achieved at a Nisin addition level of 250 ppm (10,000 IU nisin/gram). This Nisin level is 20 times the maximum addition rate in current commercial practice.

BRIEF DESCRIPTION OF THE INVENTION

The present invention includes a process for substantially completely inhibiting the outgrowth of germinated *Clostridium botulinum* spores in high moisture content pasteurized process cheese spreads, typically having a moisture content in the range of about 54 to about 60% by weight and having reduced sodium levels in the range of 40 to about 50% reduction from the typical commercial formulations which contain 2.55% disodium phosphate and 2.0% sodium chloride, comprising treating this process cheese by adding to it an amount of Nisin or Nisin-producing bacterial culture sufficient to inhibit botulinum spore outgrowth, the amount generally being from about 2,000 to about 10,000 International Units (or equivalent).

Process cheese formulations, particularly pasteurized process cheeses, are defined by the United States Food and Drug Administration's standards of identity as a food prepared by comminuting and mixing, with the aid of heat, one or more cheeses of the same or two or more varieties with a prescribed emulsifying agent into a homogeneous plastic mass. Optional ingredients may be included. Pasteurized process cheese is defined at 21 CFR 133.169 et seq. including moisture contents, typically more than 44% moisture and usually at least 54% moisture but no more than 60% moisture; see 133.179(a)(3). Sections 133.169-0.180 of 21 CFR are hereby incorporated by reference to the extent necessary to explain the invention.

Human botulism is almost invariably the result of eating preserved foods in which the bacteria, *Clostridium botulinum*, has grown and produced toxin. It appears that as the moisture content of non-refrigerated, pasteurized process cheese spreads or products increases, so too does the incidence of toxin produced by *Clostridium botulinum*. The species *Clostridium botulinum* is divided into Types A through G on the bsis of antigenic differences between the toxins; Types A, B, and E are of practical significance in the United States because they are the ones that are toxic to humans. Of these, Type A toxin is the most potent toxin and is reported to be the most potent toxic substance known.

Nisin is a polypeptide produced by some *Streptococcus lactis* strains of lactic streptococci. The most potent Nisin preparation prepared contains 40 million IU per gram. NISAPLIN is a commercial Nisin concentrate containing 1 million IU per gram commercially available from Aplin & Barrett Ltd., Beaminster, Dorset, England.

DESCRIPTION OF THE PREFERRED EMBODIMENTS

To determine the effectiveness of Nisin in preventing the outgrowth of *Clostridium botulinum* spores and subsequent toxin formation in process cheese spreads, the following experiments were conducted.

Bacterial cultures: Five strains each of *Clostridium botulinum* types A and B (A: 56, 62, 69, 77, and 90; B: 53, 113, 213, 13983, and Lamanna-okra) were used. Each strain was grown in a manner conducive to sporulation as in Christiansen et al, Appl. Microbiol. 27, pp. 733-737. The spore crops were harvested by centrifugation followed by thorough washing with sterile water. The final pellet was resuspended in sterile water to 10 ml, and the individual spore suspensions were stored frozen. A portion of each individual spore suspension was thawed and diluted in 0.1% peptone-water for enumeration of the spores (see below). After enumeration, suitable dilutions of the individual spore preparations in sterile water were made and combined to produce a mixed inoculum consisting of approximately equal numbers of each strain. These mixed spore preparations were suitably diluted in 0.1% peptone-water prior to addition to the melted cheese.

Enumeration of *C. botulinum*: *C. botulinum* was conducted by the 5-tube Most Probable Number (hereinafter MPN) technique using TPYG as the growth medium according to the FDA Bacteriological Analytical Manual for Foods (1976). For spore counts, the spore suspensions were diluted in 0.1% peptone-water and heat-shocked at 80° C. for 10 min prior to enumeration. With the stored cheese samples, similar heat-shocking methods were used. Tubes showing bacterial growth were tested for the presence of toxin by the mouse protection assay. Only toxin-positive tubes were counted in determining the Most Probable Number of *C. botulinum*. TPYG medium consisted of 5% trypticase peptone, 0.5% bactopeptone, 2% yeast extract, 0.4% glucose, and 0.1% sodium thioglycollate. The pH of TPYG medium was adjusted to 6 prior to autoclaving. The peptone-water was not adjusted prior to autoclaving.

Extraction and assay of Toxin: The procedure of Tanaka et al., noted above, was used for the extraction and assay of the toxin. Ten grams of each test sample were mixed with an equal volume of gelatin-phosphate buffer, pH 6.2. The mixture was centrifuged at 5000×g for 10 min and the aqueous supernatant fraction was analyzed for the presence of toxin. The extraction procedure allowed complete recovery by added toxin. For toxin assays of TPYG broth employed in the MPN procedure, the medium was centrifuged at 5000×g for 10 min, and the supernatant was analyzed for the presence of toxin.

In the mouse protection assay for botulinal toxin (FDA Bacteriological Analytical Manual for Foods, 1976), each of 2 mice was inoculated intraperitoneally with 0.5 ml of the extract from the test sample. Mice were held for up to 4 days and examined for symptoms and death characteristic of *C. botulinum* intoxication. When death occurred, 2 additional mice were challenged with a sample-antitoxin mixture which was preincubated at 37° C. for 30 min. Unprotected controls were again inoculated so that they could be tested simultaneously with the protected mice. Nonspecific deaths due to the cheese extract did not occur.

Cheese: A blend of American cheese, nonfat dry milk, and whey solids was employed. This was blended, a uniform product was sealed in moisture-proof plastic bags and held frozen until needed. This method of preparation insured a uniform source of raw material for all experiments. The blend was prepared with the lowest possible moisture content. The amount of nisin naturally present in this product was determined to be below the lower limit of detectability of the nisin bioassay according to Tramer et al., J. Sci. Food Agric., 15:522-528 (1964).

Formulations: Five batches of process cheese spread were prepared. Batch #1 was made to 54% moisture with 1.35% sodium phosphate, 1.1% sodium chloride, and 0.2% lactic acid. This batch served as a low spoilage control. Batches 2 through 5 were prepared at 58% moisture with 1.45% sodium phosphate and 1.2% sodium chloride. Batch 2 contained no nisin; Batch 3 had 12.5 ppm nisin; Batch 4 contained 100 ppm nisin; and Batch 5 contained 250 ppm nisin. The formulations of the various batches are tabulated in Table 1.

TABLE 1

| | Formulation of Process Cheese Spreads | | | |
|---|---|---|---|---|
| Batch No. | Percent Moisture | % Sodium Phosphate | % Sodium Chloride | ppm Nisin |
| 1 | 54 | 1.35 | 1.1 | 0 |
| 2 | 58 | 1.45 | 1.2 | 0 |
| 3 | 58 | 1.45 | 1.2 | 12.5 |
| 4 | 58 | 1.45 | 1.2 | 100 |
| 5 | 58 | 1.45 | 1.2 | 250 |

Preparation and inoculation of cheese spreads: The cheese was processed in an agitated, covered, steam-jacketed kettle. The kettle accommodated the 3 lb. batches. Each batch was completed by making 4 sub-batches. With use of the small sub-batches, very careful control of moisture was obtained, and the sub-batches were very similar in composition.

The cheese blend, water, disodium phosphate, sodium chloride, lactic acid, and NISAPLIN, a commercial formulation with $1 \times 10^6$ i.u./g, 74.7% sodium chloride, and 23% nonfat dry milk solids, were weighed into the kettle. The mixture was heated to 88° C. and held for 2 minutes. Uninoculated samples were then withdrawn for moisture, pH, and salt analyses (see below). The *C. botulinum* spore mixture was then added to the remainder of the product to give a final spore level of 1000 spores/g. The temperature of the inoculated product was kept at 88° C. for a further 2 minutes with agitation.

The processed product was poured into small glass vials, approximately 21 g per vial, to just below the rim and the screw caps were closed tight. 180 vials were prepared from each batch. The filled vials were cooled in a refrigerator for at least 1 hour, placed in anaerobe jars, and incubated as indicated below.

Incubation and sampling schedule: Samples were incubated in 2 different ways. In the first method, samples were incubated for up to 48 weeks at 30° C. In the second method, samples were held at 4° C. for 8 weeks followed by incubation at 30° C. for up to 48 weeks.

Each experimental batch was examined for spoilate (gas, uneven color change, phase separation) at 0, 4, 8, 12, 16, 20, 24, 36, and 48 weeks and if applicable at 0 and 8 weeks of refrigerated storage. Samples were routinely tested for toxin at 0, 4, 8, 12, 16, 24, 36, and 48 weeks and if applicable after 8 weeks of refrigerated storage. In addition, samples that showed obvious signs of spoilage were tested for toxin as soon as spoilage was noticed. For toxic analysis, a minimum of 10 samples per batch were tested throughout.

The number of viable *C. botulinum* organisms were determined by the 5-tube MPN method on each batch immediately following the formulation of the batch. In addition, MPNs were performed on any samples that did not spill or become toxic by the 48th week of storage (a maximum of 10 jars per batch).

Nisin analysis was performed on 10 jars of each batch at 0, 4, 8, 12, 16, 24, 36, and 48 weeks and, if applicable, at 0, 4, and 8 weeks of refrigerated storage.

Chemical analysis of the uninoculated samples: Total moisture and sodium chloride analyses were performed in triplicate by recommended AOAC methods. Two moisture procedures are given in the AOAC Manual (Assoc. Off. Anal. Chem., 12th ed., 1976) by the 100° C. vacuum oven procedure was used in this study. The procedure in Standard Methods for the Examination of Dairy Products (Bianco et al., 1972) was used to measure the pH of the finished product. Nisin analysis was performed by the *Micrococcus flavus* assay method of Tramer and Fowler, noted above.

Discussion of Results: The effectiveness of nisin in preventing the outgrowth of *C. botulinum* spores in process cheese spreads incubated at 30° C. for up to 48 weeks is shown in Table 2. A total of 7 toxic samples were found in Batch 1, the low moisture control, during the 48 week period. However in Batch 2, which had 57.0% moisture, all of the samples became toxic by the 8th week of storage. In Batch 3, which also had 57.0% moisture but also contained 12.5 ppm nisin, the majority of the samples became toxic by the 16th week of incubation although a few samples survived the entire 48-week period. Nisin at a level of 12.5 ppm delayed outgrowth and toxin production but did not prevent it. In contrast, very few toxic samples were obtained in Batches 4 and 5 during the 48-week incubation period. Analysis of samples from Batch 4, which had 56.8% moisture and 100 ppm nisin, yielded only 3 toxic samples during the entire period. No toxic samples were found during incubation of Batch 5, which had 56.7% moisture and 250 ppm nisin. The MPN data in Table 2 indicates that the spores remained viable during the incubation period but that their outgrowth was prevented by nisin. On the basis of this data it appears that Nisin exerts a sporostatic effect on spores in process cheese spreads.

TABLE 2

Toxin Production in Process Cheese Spreads. Incubated at 30° C.

| Batch | % Moisture | Initial[b] MPN/g | Final[c] MPN/g |
|---|---|---|---|
| 1 | 52.4 ± 0.6 | 2.92 × 10³ | 7.72 × 10³ |
| 2 | 57.0 ± 0.3 | 4.95 × 10³ | — |
| 3 | 57.0 ± 0.3 | 3.05 × 10³ | 5.60 × 10² |
| 4 | 56.8 ± 1.0 | 2.38 × 10³ | 4.00 × 10³ |
| 5 | 56.7 ± 0.3 | 2.40 × 10³ | 4.50 × 10² |

Number of Toxic Samples/Number of Samples Analyzed Randomly at the Following Weekly Inspection Periods:

| Batch | 0 | 4 | 8 | 12 | 16 | 24 | 36 | 48 |
|---|---|---|---|---|---|---|---|---|
| 1 | 0/10 | 0/10 | 1/10 +1[d] | 2/10 | 0/10 | 0/10 | 2/10 | 0/10 +2[c] |
| 2 | 0/4 | 4/10 +68[d] | 10/10 +8[d] | — | — | — | — | — |
| 3 | 0/4 | 4/10 +18[d] | 7/10 +20[d] | 8/10 +3[d] | 8/10 +1[d] | — | — | 1/4 |
| 4 | 0/4 | 0/10 | 1/10 +1[d] | 0/10 | 1/10 | 0/10 | 0/10 | 0/10 |
| 5 | 0/4 | 0/10 | 0/10 | 0/10 | 0/10 | 0/10 | 0/10 | 0/10 |

[a]Mean ± std. deviation of moisture levels in the individual sub-batches
[b]Mean of MPNs obtained for individual sub-batches
[c]Mean of MPNs obtained for 2 to 5 of the samples remaining at 48 weeks
[d]Additional number of spoiled and toxic samples identified at that sampling period The antibotulinal effectiveness of nisin in process cheese spreads was not altered appreciably by incubation at 4° C. for 8 weeks before incubation at 30° C. for 48 weeks (Table 3). As before, a limited number of toxic samples developed in Batch 1, the low moisture control. With Batches 2 and 3, spoilage and toxin production occurred early in the incubation period. With Batch 3, toxin production was not delayed by 12.5 ppm nisin as it seemed to be in the earlier experiment (Table 2). Again, a limited number of toxic samples were obtained with Batch 4, the 100 ppm nisin batch, and no toxic samples were found throughout the 48-week period at the 250 ppm nisin level, Batch 5.

TABLE 3

Toxin Production in Process Cheese Spreads Held for 8 Weeks at 4° C. Before Incubation at 30° C.

| Batch | Initial[b] % Moisture | Final[c] MPN/g | MPN/g | −8[d] | 0 | 4 | 8 | 12 | 16 | 24 | 36 | 48 |
|---|---|---|---|---|---|---|---|---|---|---|---|---|
| 1 | 52.4 ± 0.6 | 2.92 × 10³ | 4.20 × 10³ | 0/10 | 0/10 | 0/10 | 2/10 | — | 0/10 +3 | 1/10 | 1/10 +2 | 0/10 |
| 2 | 57.0 ± 0.3 | 4.95 × 10³ | — | 0/10 | 0/10 | 10/10 +54[e] | 10/10 +5[e] | — | — | — | — | — |
| 3 | 57.0 ± 0.3 | 3.05 × 10³ | 1.50 × 10² | 0/10 | 0/10 | 9/10 +16[e] | 7/10 +22[e] | 3[e] | 2[e] | 1[e] | — | 1/2 |
| 4 | 56.8 ± 1.0 | 2.38 × 10³ | 2.60 × 10² | 0/10 | 0/10 | 0/10 | 3/10 | — | 2/10 | 1/10 | 0/10 | 0/10 |
| 5 | 56.7 ± 0.3 | 2.40 × 10³ | 2.50 × 10² | 0/10 | 0/10 | 0/10 | 0/10 | — | 0/10 | 0/10 | 0/10 | 0/10 |

[a]Mean ± std. deviation of moisture levels in the individual sub-batches
[b]Mean of MPN obtained for individual sub-batches
[c]Mean of MPNs obtained for 2 to 5 of the samples remaining at 48 weeks
[d]Data obtained at onset of 8-week period of refrigerated storage
[e]Additional number of spoiled and toxic samples identified at that sampling period The residual nisin levels obtained with the process cheese spreads following the two modes of incubation are shown in Table 4 and Table 5. The nisin bioassay did not yield particularly consistent results. The inconsistency may be due to a variety of factors including binding of nisin in the cheese matrix, incomplete and inconsistent extraction of the nisin, and certain technical difficulties with the nisin bioassay itself. The binding and extraction problems appear to be the most serious difficulties. The data in Tables 4 and 5 definitely indicate that nisin does not decompose on storage in process cheese spreads. No evidence of nisin decomposition on refrigerated storage was found (Table 5). Appreciable levels of nisin (50% or more of the added level) were found in samples incubated for 48 weeks at 30°.

TABLE 4

Residual Nisin Levels in Process Cheese Spread Samples Incubated at 30° C.

| Batch | 0 | 4 | 8 | 12 | 16 | 24 | 36 | 48 |
|---|---|---|---|---|---|---|---|---|
| 1 | ND[a] | ND | ND | ND | ND | ND | ND | ND |
| 2 | ND | ND | ND | ND | ND | ND | ND | ND |
| 3 | 11.8 | 17.5 | 8.9 | 2.1 | 6.9 | ND[b] | ND[b] | 6.1 |
| 4 | 73.2 | 123 | 34.5 | 75.3 | 44.7 | 51.8 | 11.9 | 46.5 |

TABLE 4-continued

Residual Nisin Levels in Process Cheese Spread Samples Incubated at 30° C.

| Batch | 0 | 4 | 8 | 12 | 16 | 24 | 36 | 48 |
|---|---|---|---|---|---|---|---|---|
| 5 | 187 | 246 | 68.6 | 238 | 167 | 11.9 | 110 | 144 |

[a] Not done; nisin was not added to batches 1 and 2
[b] Not done because insufficient number of unspoiled samples were available

TABLE 5

Residual Nisin Levels in Process Cheese Spread Samples Held at 4° C. for 8 Weeks Before Incubation at 30° C.
Nisin Level (ppm) at week:

| Batch | −8[a] | 0 | 4 | 8 | 12 | 16 | 24 | 36 | 48 |
|---|---|---|---|---|---|---|---|---|---|
| 1 | ND[b] | ND | ND | ND | ND | ND | ND | ND | ND |
| 2 | ND | ND | ND | ND | ND | ND | ND | ND | ND |
| 3 | 11.8 | 17.2 | 2.6 | 6.4 | ND[c] | ND[c] | ND[c] | ND[c] | 9.8 |
| 4 | 73.2 | 44.5 | 55.4 | 74.7 | ND | 15.3 | 49.4 | 4.8 | 30.1 |
| 5 | 187 | 274 | 320 | 245 | ND | 140 | 148 | 22.6 | 150 |

[a] Data obtained at onset of 8-week period of refrigerated storage
[b] Not done; nisin was not added to batches 1 and 2
[c] Not done because insufficient number of unspoiled samples were available.

Based upon our studies we have found that nisin is an effective antibotulinal agent in high moisture process cheese spreads. The 57% moisture process cheese spreads without nisin supported the outgrowth of *C. botulinum* spores and allowed toxin production to occur in the early weeks of incubation at 30° C. Addition of nisin at 100 ppm severely limited outgrowth and toxin production, and addition of nisin at 250 ppm completely prevented outgrowth and toxin production. A nisin level of 12.5 ppm was ineffective.

The levels of nisin required to prevent botulinal outgrowth and toxin production in high moisture process cheese spreads were higher than the levels required in TPYG broth; see Scot and Taylor, J. Food Sci., 46:117–120 and 121–126, and Somers, J. Food Sci., 46:1972–3, all noted above. In TPYG broth, nisin levels of 12.5 to 25 ppm were effective in controlling outgrowth and toxin production by the type A and B spores at pH 6 and a spore load of 10³ spores/ml. These conditions most closely match the conditions present in the process cheese spread. The studies in TPYG broth indicated that temperature of heat-shocking, pH, and spore load were critical factors in determining the level of nisin required to prevent outgrowth and toxin production by *C. botulinum* spores. Apparently, other factors exist that limit the antibotulinal effectiveness of nisin in process cheese spreads. The binding of nisin in the cheese matrix or matrix-related limitations on contact between nisin and the spores may have been responsible, although we have no direct information to explain the difference between the inhibitory levels of nisin in process cheese spreads versus TPYG broth.

Some comment must be made on the cheese formulations used in this study as opposed to "typical" American process cheese spread formulations. Tanaka et al showed that typical formulations would not support botulinal outgrowth and toxin production. Their typical formulations contained either 52% or 54% moisture and 2.5% disodium phosphate plus 2.0% sodium chloride. In addition, Tanaka et al demonstrated that 58% moisture process cheese spreads made with either 2.5% disodium phosphate or 3.0% sodium citrate would support botulinal outgrowth and toxin production.

A low moisture (52.4%) process cheese spread made with 1.35% disodium phosphate and 1.1% sodium chloride allowed a limited amount of botulinal outgrowth and toxin production. Apparently, at the typically used moisture levels, severe deviations from normal formulations must be made before significant botulinal outgrowth and toxin production can occur. This finding suggests that a rather large safety factor exists at typical moisture levels.

However, the fact remains that process cheese spreads can be legally formulated to 60 moisture levels, i.e. to comply with 21 CFR 133.179(a)(3). The 60% moisture level is not used as a practical matter because shelf-life of the product is severely limited at this moisture level. The data of Tanaka et al would indicate that antibotulinal protection is not proved at the higher moisture levels in addition to the other spoilage problems. The data from Batch 2, reported above, confirms the lack of antibotulinal protection in higher moisture process cheese spreads. Batch 2 had 57% moisture with 1.45% disodium phosphate and 1.2% sodium chloride. However, the data from this experiment clearly indicate that high moisture process cheese spreads can be prepared with the addition of 250 ppm nisin. Antibotulinal protection was provided by 250 ppm nisin in a process cheese spread formulated at 57% moisture with 1.45% disodium phosphate and 1.2% sodium chloride. It appears that nisin will allow safe formulation, from the standpoint of antibotulinal protection, of process cheese spreads with both higher moisture levels and lower amounts of sodium.

What is claimed is:

1. A process for controlling the growth of *Clostridium botulinum* spores and the elaboration of botulinum toxin therefrom in a high moisture content pasteurized process cheese product containing at least 54% moisture, said process comprising adding to said cheese product an amount of nisin in the range of at least 12.5 to about 300 parts per million or a nisin-producing culture sufficient to prevent botulinum spore growth.

2. The process according to claim 1 in which the moisture content of the cheese is from 54% up to about 60%.

3. The process according to claim 2 in which the moisture content is from about 54 to about 58%.

4. The process according to claim 1 in which from about 2,000 to about 10,000 International Units of nisin are added per gram of cheese product.

5. A pasteurized process cheese product containing from about 100 to about 300 parts per million nisin produced by the process of claim 1.

6. The process as claimed in claim 1 in which an amount of at least 2000 International Units (50 ppm) of nisin is added or incorporated per gram of cheese product.

7. The process as claimed in claim 6 in which an amount of at least 4000 International Units (100 ppm) of nisin is added or incorporated per gram of cheese of product.

8. A process as claimed in claim 6 in which an amount up to 12,000 International Units (300 ppm) of nisin is added or incorporated per gram of cheese product.

9. A pasteurized process cheese product containing at least 54% by weight of moisture containing an amount of nisin or a nisin-producing culture sufficient to inhibit botulinum spore growth.

10. The cheese product as claimed in claim 9 in which the moisture content is from 54 to 60% by weight.

11. The cheese product as claimed in claim 10 in which the moisture content is from 54 to 58% by weight.

12. The cheese product as claimed in claim 9 containing at least 2,000 IU (50 ppm) of nisin.

13. A cheese product as claimed in claim 9 containing from about 1.0 to about 1.3% by weight disodium phosphate and from about 0.8 to about 1.0% by weight of sodium chloride.

* * * * *